United States Patent
Nishiyama et al.

(10) Patent No.: US 8,015,802 B2
(45) Date of Patent: Sep. 13, 2011

(54) EXHAUST GAS PURIFICATION DEVICE FOR INTERNAL COMBUSTION ENGINE

(75) Inventors: Toshihiko Nishiyama, Oyama (JP); Koji Iijima, Oyama (JP)

(73) Assignee: Komatsu Ltd., Tokyo (JP)

( * ) Notice: Subject to any disclaimer, the term of this patent is extended or adjusted under 35 U.S.C. 154(b) by 885 days.

(21) Appl. No.: 11/720,174

(22) PCT Filed: Nov. 24, 2005

(86) PCT No.: PCT/JP2005/021592
§ 371 (c)(1),
(2), (4) Date: Feb. 11, 2008

(87) PCT Pub. No.: WO2006/057305
PCT Pub. Date: Jun. 1, 2006

(65) Prior Publication Data
US 2008/0264048 A1    Oct. 30, 2008

(30) Foreign Application Priority Data
Nov. 25, 2004   (JP) .................................. 2004-341098

(51) Int. Cl.
*F01N 3/00* (2006.01)
(52) U.S. Cl. ................. 60/286; 60/295; 60/296; 60/297; 60/301
(58) Field of Classification Search .............. 60/286, 60/295, 296, 297, 298, 303, 301
See application file for complete search history.

(56) References Cited

U.S. PATENT DOCUMENTS

| | | | | |
|---|---|---|---|---|
| 5,653,105 A | * | 8/1997 | Noirot et al. | 60/297 |
| 5,829,248 A | * | 11/1998 | Clifton | 60/286 |
| 6,680,037 B1 | | 1/2004 | Allansson et al. | |
| 7,112,231 B2 | * | 9/2006 | Cote, Jr. | 55/385.3 |

(Continued)

FOREIGN PATENT DOCUMENTS
DE   19932778 A1 *   1/2001
(Continued)

OTHER PUBLICATIONS
Notification Concerning Transmittal of International Preliminary Report on Patentability and Written Opinion, Chapter I of the Patent Cooperation Treaty for PCT/JP2005/021592, 5 sheets.

*Primary Examiner* — Tu M Nguyen
(74) *Attorney, Agent, or Firm* — Holtz, Holtz, Goodman & Chick, PC

(57) ABSTRACT

An inlet chamber 40 and outlet chamber 50 for exhaust gas are integrated as an inflow/outflow section 80, and a first post treatment device 10 equipped with a DPF 13 at its central portion and second post-treatment device 20 equipped with a urea DeNOx catalyst 23 on its outer periphery side are integrated as a catalyst installation section 70. The catalyst installation section 70, the inflow/outflow section 80, and a communication chamber forming section 30 are provided separately and detachably from one another, and the catalyst installation section 70 is made installable in a reversible manner. As a result, by reversing the catalyst installation section 70, it is possible to easily reverse the DPF 13 without having to extract it from the central part. Further, since the urea DeNOx catalyst 23 is reversed simultaneously, it is possible to change the direction in which the exhaust gas flows therein, thereby enabling to prevent unbalanced deterioration of the urea DeNOx catalyst 23.

11 Claims, 5 Drawing Sheets

U.S. PATENT DOCUMENTS

| | | | |
|---|---|---|---|
| 7,398,645 B2 * | 7/2008 | Zheng et al. | 60/288 |
| 7,797,928 B2 * | 9/2010 | Friedrich et al. | 60/284 |
| 2003/0108457 A1 | 6/2003 | Gault et al. | |

FOREIGN PATENT DOCUMENTS

| | | |
|---|---|---|
| DE | 101 55 086 A1 | 5/2003 |
| GB | 2 381 218 A | 4/2003 |
| JP | 8-144740 A | 6/1996 |
| JP | 2003-120277 A | 4/2003 |
| JP | 2003-516492 A | 5/2003 |
| WO | WO 01/42630 A2 | 6/2001 |
| WO | WO 03/036056 A1 | 5/2003 |
| WO | WO 2004099577 A1 * | 11/2004 |

* cited by examiner

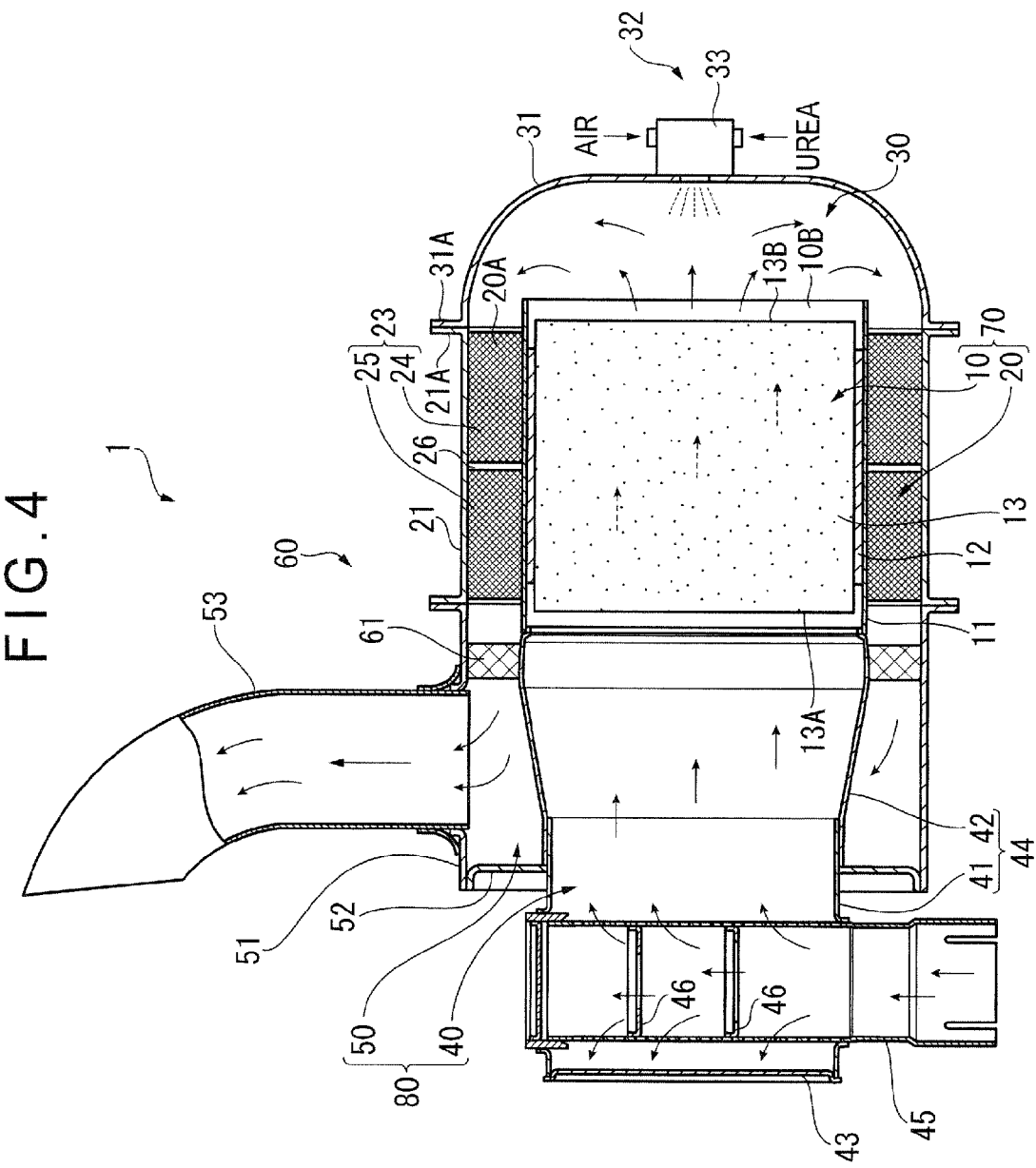

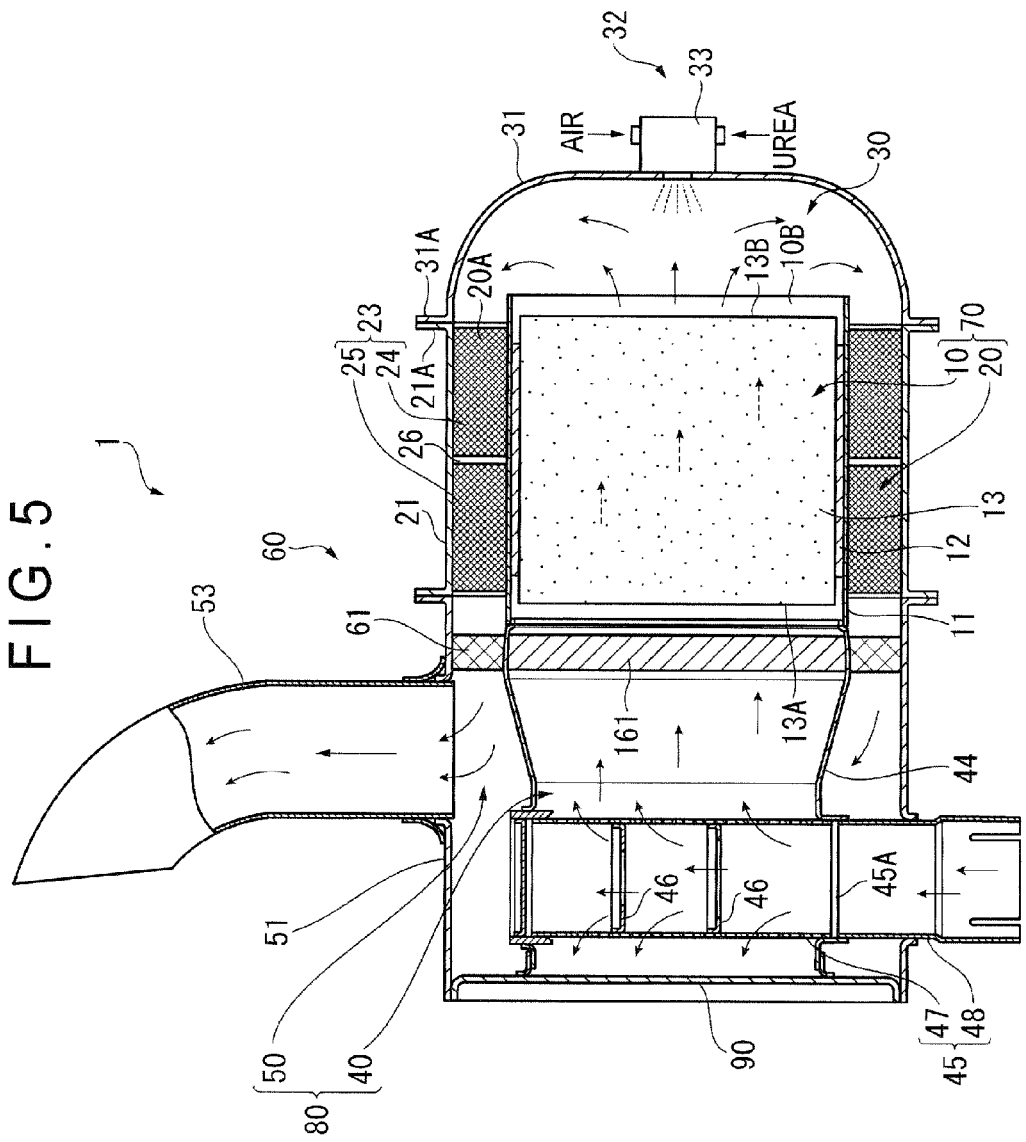

EXHAUST GAS PURIFICATION DEVICE FOR INTERNAL COMBUSTION ENGINE

This application is a U.S. National Phase Application under 35 USC 371 of International Application PCT/JP2005/021592 filed Nov. 24, 2005.

TECHNICAL FIELD

The present invention relates to an exhaust gas purification device for an internal combustion engine and, more specifically, to an exhaust gas purification device for an internal combustion engine provided in an exhaust flow passage of an internal combustion engine to purify exhaust gas.

BACKGROUND ART

As is conventionally known, an exhaust gas purification device is provided in an exhaust flow passage of an internal combustion engine in order to collect particulate (particulate substance) in exhaust gas discharged from an internal combustion engine and to reduce the amount of NOx therein.

As an exhaust gas purification device for collecting particulate, there has been developed one equipped with a diesel particulate filter (hereinafter referred to as DPF), and, as an exhaust gas purification device for achieving a reduction in NOx amount, there has been developed one equipped with a DeNOx catalyst such as a NOx reduction catalyst or a NOx occlusion reduction catalyst.

In recent years, the exhaust gas regulations are becoming more and more strict. To cope with this, there has been proposed an exhaust gas purification device in which a DPF and a DeNOx catalyst are combined in series. In such an exhaust gas purification device, particulate is collected by the DPF on the input side, which is, for example, on the upstream side, and it is possible to achieve a reduction in NOx by the DeNOx catalyst on the output side, which is on the downstream side thereof, thus making it possible to achieve a further improvement in exhaust gas purification performance.

Further, as an exhaust gas purification device in which a DPF and a DeNOx catalyst are combined, there is known one in which a contrivance is made in terms of exhaust gas flow, thereby achieving an overall reduction in size (Patent Document 1). In the exhaust gas purification device disclosed in Patent Document 1, a columnar DPF is arranged at the center, and an annular DeNox catalyst is arranged so as to surround the DPF. Exhaust gas is caused to flow in at one end of the DPF, and to flow out at the other end thereof. The flow of the exhaust gas caused to flow out is reversed, caused to flow in at the other end (on the same side as the other end of the DPF) of the DeNOx catalyst in the outer periphery, and caused to flow out at one end thereof (on the same side as one end of the DPF).

[Patent Document] U.S. Pat. No. 6,680,037

DISCLOSURE OF THE INVENTION

Problems to be Solved by the Invention

Generally speaking, a DPF is provided with a large number of thin pores for the inflow of exhaust gas to extend from one end to the other end thereof. Half of the pores are closed at one end, and the remaining half of the pores are closed at the other end. With this structure, exhaust gas having flowed into the pores with no inlet closing is checked by the closing at the other end, and flows through the peripheral walls of the pores into the adjacent other flow passages. Conversely, in the other pores, closing is effected at one end to leave the other end open, so that the exhaust gas flows out of the other end. That is, the boundary walls between the pores function as filters, collecting particulate at those boundary wall portions.

Further, in the DPF of such a structure, by reversing the inflow side and the outflow side for the exhaust gas, it is possible to remove the particulate collected prior to the reversal with the exhaust gas flow after the reversal, thereby making it possible to prevent clogging due to particulate. In this way, also in the exhaust gas purification device of Patent Document 1, the DPF is provided so as to be reversible.

However, in the exhaust gas purification device as disclosed in Patent Document 1, the DeNOx catalyst is arranged around the DPF, and the whole is covered with a drum body, so that, to reverse the DPF, it is necessary to open the drum body, extract the DPF surrounded by the DeNOx catalyst, and then insert it again after reversing it, thus involving a rather time consuming, bothersome operation.

Further, the DeNOx catalyst is fixed so as to be always directed in the same direction, so that its portion on the exhaust gas inflow side is more subject to deterioration, and unbalance in catalyst performance is generated between the inflow side and the outflow side, resulting in a rather poor utilization efficiency for the DeNOx catalyst.

It is an object of the present invention to provide an exhaust gas purification device for an internal combustion engine which facilitates the reversal of one post treatment device and helps to achieve an improvement in the utilization efficiency of the other post treatment device.

Means for Solving the Problems

An exhaust gas purification device for an internal combustion engine according to a first aspect of the invention includes: an inflow and outflow section divided into an inlet chamber into which unpurified exhaust gas flows and an outlet chamber from which purified exhaust gas is discharged, with the inlet chamber and the outlet chamber being arranged concentrically; a catalyst installation section which is connected to the inflow and outflow section and in which two or more kinds of catalysts differing in an object of treatment are arranged concentrically around an axis along a connecting direction of the catalyst installation section and the inflow and outflow section and integrated with each other, and a communication chamber forming section, connected to a side of the catalyst installation section opposite to the inflow and outflow section side and adapted to reverse a flow of exhaust gas flowing in through the inlet chamber to a direction of the outlet chamber, for forming a communication chamber.

According to a second aspect of the invention, in the exhaust gas purification device for the internal combustion engine in the first aspect of the invention, the catalyst installation section has same connection portions on the inflow and outflow section side and on a communication chamber forming section side.

According to a third aspect of the invention, in the exhaust gas purification device for the internal combustion engine in the first aspect of the invention, the catalyst installation section has the inflow and outflow section side and a communication chamber forming section side formed symmetrically with respect to a section orthogonal to the connecting direction.

According to a fourth aspect of the invention, in the exhaust gas purification device for the internal combustion engine in the third aspect of the invention, the catalyst installation section is provided with an outer cylinder portion covering an outermost periphery and an inner cylinder portion provided between different catalysts, and a forward end of the inner cylinder portion in the connecting direction protrudes beyond a forward end of the outer cylinder portion, with a protruding portion being fit-engaged with the inflow and outflow section.

According to a fifth aspect of the invention, in the exhaust gas purification device for the internal combustion engine in the first aspect of the invention, the inflow and outflow section is divided into the inlet chamber on an inner side and an outlet chamber on the outer side, and the catalyst arranged at the center of the catalyst installation section is a diesel particulate filter.

According to a sixth aspect of the invention, in the exhaust gas purification device for the internal combustion engine in the fifth aspect of the invention, the diesel particulate filter has a DeNOx catalyst arranged on an outer side thereof.

According to a seventh aspect of the invention, in the exhaust gas purification device for the internal combustion engine in the sixth aspect of the invention, the DeNOx catalyst is a urea DeNOx catalyst, and the communication chamber forming section has a reducing agent supply device provided therein.

According to an eighth aspect of the invention, in the exhaust gas purification device for the internal combustion engine in the seventh aspect of the invention, the communication chamber has a flow passage extending therefrom to the outlet chamber, with the flow passage being provided with an oxidation catalyst making ammonia harmless.

According to a ninth aspect of the invention, in the exhaust gas purification device for the internal combustion engine in the first aspect of the invention, the inlet chamber is provided with an inlet pipe into which unpurified exhaust gas flows in a direction orthogonal to a direction in which exhaust gas flows to the catalyst installation section, and the outlet chamber is provided with an outlet pipe for discharging purified exhaust gas in a direction orthogonal to a direction in which the exhaust gas purified by the catalyst installation section flows.

According to a tenth aspect of the invention, in the exhaust gas purification device for the internal combustion engine in the ninth aspect of the invention, the inlet chamber and the outlet chamber are defined by an inner cylinder portion and an outer cylinder portion arranged concentrically, with ends of the cylinder portions on a side opposite to a side where connection to the catalyst installation section is effected being closed by a side wall portion, and the end of the inner cylinder portion protruding outwardly beyond the end of the outer cylinder portion, and an inlet pipe or an outlet pipe provided in a chamber formed on the inner side of the inner cylinder portion is provided at a portion where the inner cylinder portion protrudes.

According to an eleventh aspect of the invention, in the exhaust gas purification device for the internal combustion engine in the ninth aspect of the invention, the inlet chamber and the outlet chamber are defined by an inner cylinder portion and an outer cylinder portion arranged concentrically, with ends of the cylinder portions on a side opposite to a side where connection to the catalyst installation section is effected being closed by a side wall portion, and an inlet pipe or an outlet pipe provided in a chamber formed on the inner side of the inner cylinder portion is provided so as to extend through a peripheral wall of the outer cylinder portion, and is fit-engaged with the inner cylinder portion and fixed to the outer cylinder portion.

A catalyst installation unit according to a twelfth aspect of the invention may constitute a sub combination invention for use in the exhaust gas purification device of the first through eleventh aspects of the invention.

More specifically, the catalyst installation unit according to the twelfth aspect of the invention, used in an exhaust gas purification device for the internal combustion engine, including: an inflow and outflow section divided into an inlet chamber into which unpurified exhaust gas flows and an outlet chamber from which purified exhaust gas is discharged, with the inlet chamber and the outlet chamber being arranged concentrically; and a communication chamber forming section adapted to reverse a flow of exhaust gas flowing in through the inlet chamber to the direction of the outlet chamber, and is connected between the inflow and outflow section and the communication chamber forming section, the catalyst installation unit has a feature in which two or more kinds of catalysts differing in an object of treatment and connected to the inflow and outflow section are arranged concentrically around an axis in the connecting direction and integrated with each other.

EFFECTS OF THE INVENTION

According to the first aspect of the invention, the exhaust gas purification device for the internal combustion engine is composed of the three components of the inflow/outflow section, the catalyst installation section, and the communication chamber forming section. As a result, when, owing to deterioration in the catalyst, unbalance in catalyst performance is generated between the inflow side and the outflow side, it is possible to re-use the device by reversing the catalyst installation section, thereby enabling to improve the utilization efficiency of the post treatment devices.

Thus, in the case, for example, of a device in which one of the two post treatment devices, with which different catalysts are equipped, is equipped with a DPF, and in which the other is equipped with a DeNOx catalyst, an integrated catalyst installation section is formed by the DPF and the DeNOx catalyst, so that by reversing this catalyst installation section with respect to the inflow/outflow section and the communication chamber, it is possible to reverse the DPF and the DeNOx catalyst at one time, and to facilitate the reversing operation as compared with the prior-art technique in which it is necessary to open the drum body and extract exclusively the DPF before inserting it again. Further, it is possible to satisfactorily prevent clogging in the DPF due to particulate. Further, since the entire catalyst installation section is reversed, it is also possible to reverse the NOx catalyst, and unbalance in catalyst performance is not liable to be generated in the DeNOx catalyst, thus making it possible to improve the utilization efficiency of the DeNOx catalyst.

According to the second aspect of the invention, the connecting portion on the inflow/outflow section side and the connecting portion on the communication chamber forming section side of the catalyst installation section are of the same connection structure, so that the installation at the time of reversal is facilitated.

According to the third aspect of the invention, the inflow/outflow section connection side and the communication chamber forming section connection side of the catalyst installation section are formed symmetrically with respect to a section orthogonal to the connecting direction. As a result, when the performance of the catalyst portion on the inflow/outflow section connection side is deteriorated, it is possible to connect, through reversal, the catalyst portion on the connection chamber connection side whose performance has not been deteriorated so much to the inflow/outflow section connection side, so that it is possible to reliably improve the utilization efficiency of the catalyst.

According to the fourth aspect of the invention, the forward end of the inner cylinder portion protrudes beyond the forward end of the outer cylinder portion, and the protruding portion is fit-engaged with the inflow/outflow section. As a result, ventilation is secured between the inlet chamber or the outlet chamber arranged on the inner side of the inflow/outflow section and the catalyst arranged on the inner side of the inner cylinder portion, making it possible to reliably effect purification with the catalyst on the inner side.

According to the fifth aspect of the invention, the DPF is arranged at the center, whereby the DPF can be formed in a columnar configuration, so that it is possible to easily produce the DPF formed of a ceramic material.

According to the sixth aspect of the invention, the DeNOx catalyst is arranged on the outer side of the DPF. As a result, the unpurified exhaust gas introduced through the inlet chamber of the inflow/outflow section is successively purified by the catalyst, making it possible to obtain an exhaust gas purification device which can attain a high NOx removal efficiency with a DeNOx catalyst.

According to the seventh aspect of the invention, a reducing agent supply device is provided in the communication chamber forming section. As a result, there is no need to separately provide a reducing agent supply space, thereby making it possible to make the exhaust gas purification device more compact.

According to the eighth aspect of the invention, a cleaning-up oxidation catalyst is provided in the flow passage from the communication chamber to the outlet chamber. As a result, it is possible to make harmless the resultant surplus ammonia due to the DeNOx catalyst, making it possible to prevent it from being discharged to the exterior as ammonia.

According to the ninth aspect of the invention, inside the inlet chamber and the outlet chamber of the inflow/outflow section for exhaust gas, there are provided an inlet pipe and an outlet pipe such that exhaust gas flows in and out in a direction perpendicular to the exhaust gas flowing direction in the catalyst installation section, so that the routing of the piping between the internal combustion engine and the exhaust gas purification device is facilitated. In particular, even in the engine room of a construction machine with small space, it is possible to reliably mount the exhaust gas post treatment device.

According to the tenth aspect of the invention, there protrudes an inner cylinder portion defining a chamber formed on the inner side, and the inlet pipe or the outlet pipe is provided on this protruding portion. As a result, it is possible to mount the entrance/outlet pipe to the portion exposed to the exterior, enabling to facilitate the mounting from the outside.

According to the eleventh aspect of the invention, the inner chamber need not protrude from the outer chamber but is completely accommodated in the outer chamber, so that the inflow/outflow section can be made compact, making it possible to achieve an overall reduction in the size of the exhaust gas purification device. Further, the inlet pipe or the outlet pipe of the inner chamber is bonded to the inner chamber through fit-engagement. Accordingly, by providing allowance in the setting of the fit-engagement margin, it is possible to reduce the thermal stress at the bonding portion even if thermal deformation occurs in the inner cylinder portion and the entrance/outlet pipe of the inner chamber, thereby achieving an improvement in terms of durability.

According to the twelfth aspect of the invention, the catalyst installation section forming the exhaust gas purification device is thus formed as a unit, whereby it is possible to improve the catalyst performance of the exhaust gas purification device solely by purchasing a new catalyst installation unit. Further, the catalyst combination can be easily changed according to the condition of the exhaust gas.

BRIEF DESCRIPTION OF DRAWINGS

FIG. 4 is a sectional view of a first modification of the present invention; and FIG. 5 is a sectional view of a second modification of the present invention.

EXPLANATION OF CODES

1 . . . exhaust gas purification device, 10 . . . first post treatment device, 13 . . . DPF: diesel particulate filter, 23 . . . urea DeNOx catalyst which is DeNOx catalyst, 20 . . . second post treatment device, 30 . . . communication chamber, 40 . . . inlet chamber, 43, 52, 90 . . . side wall portion, 44 . . . inner cylinder portion, 45 . . . inlet pipe, 50 . . . outlet chamber, 51 . . . outer cylinder portion, 53 . . . outlet pipe, 61 . . . oxidation catalyst, 70 . . . catalyst installation section, 80 . . . inflow/outflow section

BEST MODE FOR CARRYING OUT THE INVENTION

First Embodiment

In the following, a first embodiment of the present invention will be described with reference to the drawings.

Figure 1:
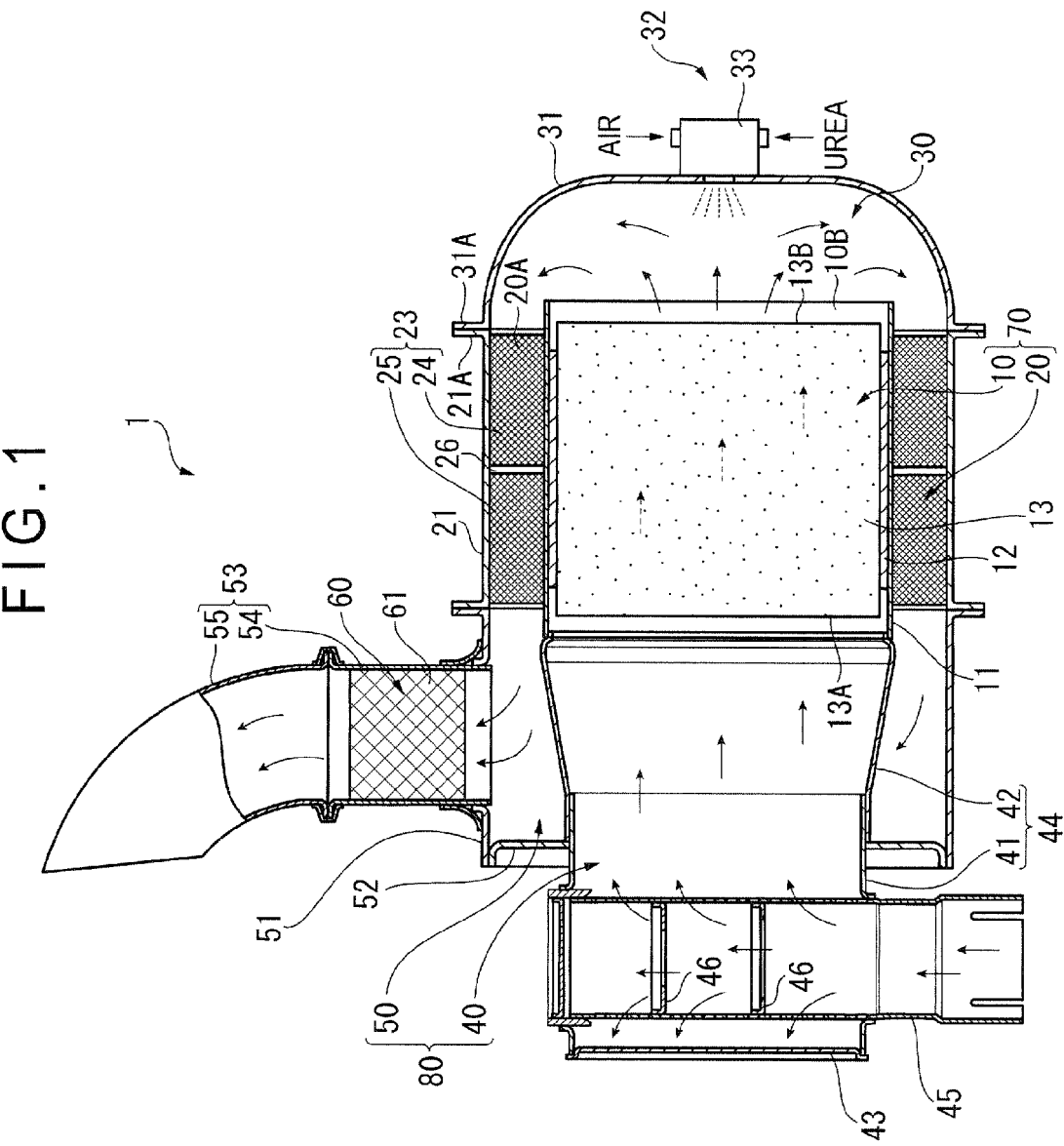
FIG. 1 is a general sectional view of an exhaust gas purification device for an internal combustion engine according to a first embodiment of the present invention.
Figure 2:
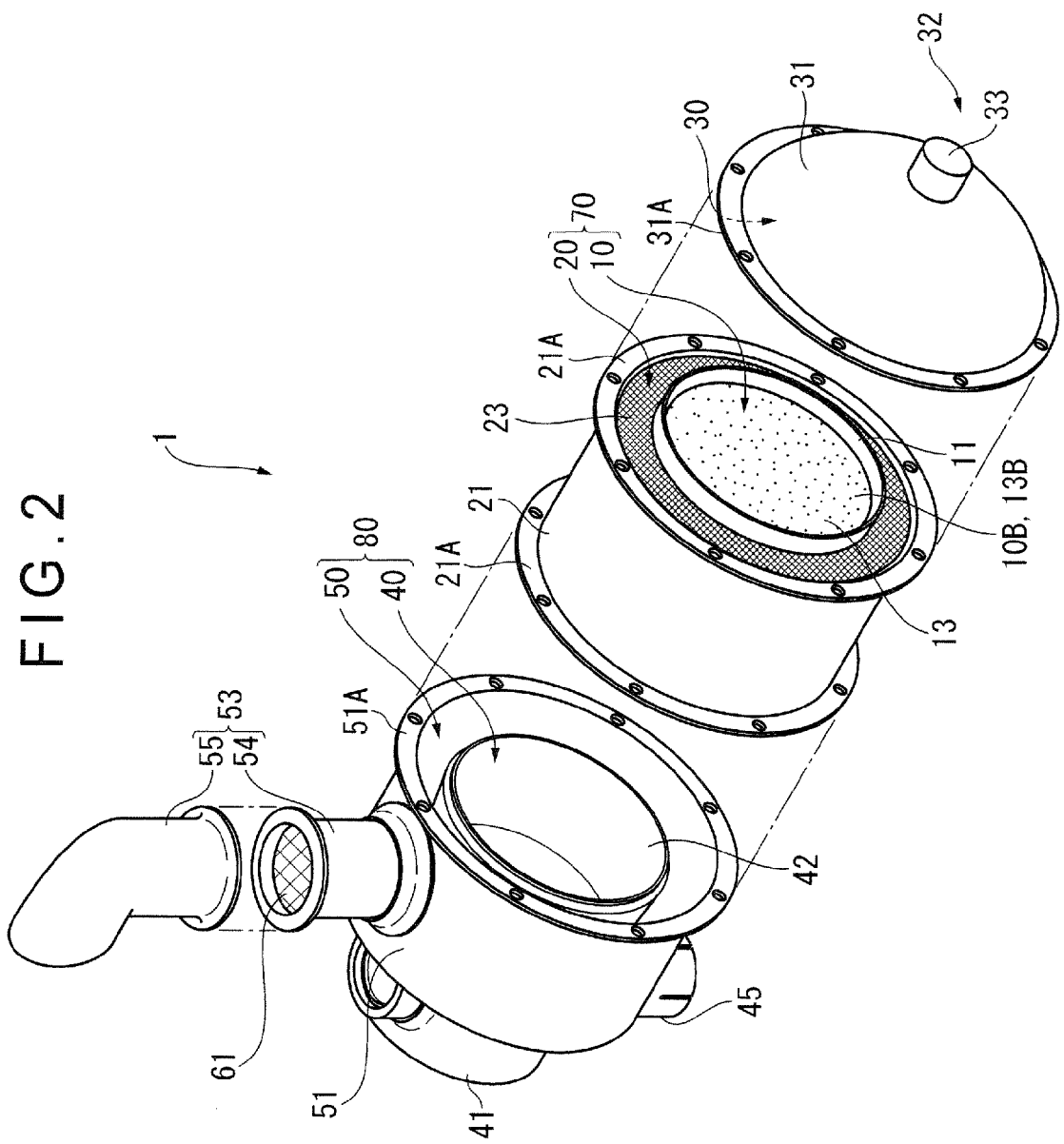
FIG. 2 is an exploded perspective view of the exhaust gas purification device.

FIG. 1 is a general sectional view of an exhaust gas purification device 1 for an internal combustion engine according to this embodiment, and FIG. 2 is an exploded perspective view of the same. A diesel engine is assumed as the internal combustion engine of this embodiment.

The exhaust gas purification device 1 is a device which is provided in the exhaust flow passage of a diesel engine and which collects particulate contained in the exhaust gas and serves to reduce the amount of NOx discharged into the atmosphere; it also serves as an exhaust muffler. The exhaust gas purification device 1 is suitably mounted in construction equipment such as a hydraulic shovel, a bulldozer, and a wheel loader.

As shown in FIGS. 1 and 2, the exhaust gas purification device 1 is a device which purifies exhaust gas by a first post treatment device 10 and a second post treatment device 20 and which is formed by connecting together a communication chamber forming section 30, a catalyst installation section 70, and an inflow/outflow section 80.

(1) Construction of the Inflow/Outflow Section 80

The inflow/outflow section 80 is divided into an inlet chamber 40 and an outlet chamber 50, which are defined by an outer cylinder portion 51 and an inner cylinder portion 44.

More specifically, the inlet chamber 40 is a space into which exhaust gas from a turbo supercharger or the like (not shown) flows temporarily. As shown in FIG. 1, it is formed by a cylindrical first inner cylinder portion 41 outwardly protruding from the outlet chamber 50, a second inner cylinder portion 42 provided on the downstream side of the first inner cylinder portion 41, and a side wall portion 43 closing one end of the inner cylinder portion 41. That is, the inner cylinder portion 44 of the present invention is formed by the first and second inner cylinder portions 41 and 42, which are integrally fixed together.

Here, the second inner cylinder portion 42 diverges toward the downstream side, and the end portion peripheral edge thereof is detachably fit-engaged with an inner case 11 of the first post treatment device 10.

A side wall portion 52 is provided in the outer periphery of the first inner cylinder portion 41. The side wall portion 52 is formed in an annular configuration; from an opening portion thereof, there protrudes the first inner cylinder portion 41 of the inlet chamber 40, and the side wall portion 52 and the first inner cylinder portion 41 are fixed to each other by welding or the like. While it is also possible to fix the second inner cylinder portion 42 to the side wall portion 52 by welding or the like, the second inner cylinder portion 42 can also be just fit-engaged with the inner cylinder portion 41.

The portion of the inner cylinder portion 41 protruding from the outlet chamber 50 is equipped with an inlet pipe 45 for causing exhaust gas from the turbo supercharger side to flow into the inlet chamber 40. By providing the inlet pipe 45 in the protruding portion, the welding thereof to the first inner cylinder portion 41, etc. can be easily conducted from the outside.

The inlet pipe 45 is provided on the peripheral surface of the first inner cylinder portion 41, whereby the exhaust gas is drawn-in in a direction substantially at right angles with respect to the exhaust gas flow inside the catalyst installation section 70. In this way, it is possible to reduce the length of the piping from the turbo supercharger, enabling to reduce the requisite space for the routing of the piping. The inlet pipe 45 is provided in a length large enough to radially extend across the inner space of the inlet chamber 40, and exhaust gas flows out through a large number of holes provided in the peripheral surface thereof.

Provided inside the inlet pipe 45 are a pair of partition members 46 having round openings; by enlarging the round openings of the partition members 46 on the upstream side, the amount of exhaust gas flowing out is made even in the longitudinal direction of the inlet pipe 45.

The outlet chamber 51 is formed by the outer cylinder portion 51 covering the second inner cylinder portion 42 of the inlet chamber 40, and the side wall portion 52 covering one end of the outer cylinder portion 51.

The outer cylinder portion 51 is substantially of the same diameter as an outer case 21 to be used in the catalyst installation section 70 described below, and is equipped with a flange 51A extending along the outer periphery thereof with a plurality of holes for inserting fixing screws being formed in the flange 51A.

An outlet pipe 53 for discharging exhaust gas is provided on the outer cylinder portion 51 of the outlet chamber 50. The outlet pipe 53 is also provided on the peripheral surface of the outer cylinder portion 51, whereby exhaust gas is discharged in a direction substantially at right angles with respect to the exhaust gas flow in the catalyst installation section 70. With this arrangement, it is possible for the outlet pipe 53 to protrude outwardly through the hood of the engine room, and there is no need to route the outlet pipe 53 within the small engine room.

Further, the outlet pipe 53 is composed of a straight pipe 54 on the proximal side fixed to the outer cylinder portion 51, and a tail pipe 55 detachably mounted to the distal end of the straight pipe 54 by a V-coupling, with an auxiliary device 60 being arranged inside the straight pipe 54.

The auxiliary device 60 is equipped with an oxidation catalyst 61 arranged through the intermediation of a buffer member (not shown). The oxidation catalyst 61 differs in nature from the oxidation catalyst with which a DPF 13 described below is coated. That is, here, the oxidation catalyst 61 serves to oxidize the resultant surplus ammonia at a urea DeNOx catalyst 23 on the upstream side described below, making it harmless by decomposing it into nitrogen and water.

(2) Construction of the Catalyst Installation Section 70

The catalyst installation section 70 is formed as a replaceable unit, and, as shown in FIG. 2, is equipped with the first post treatment device 10 containing the DPF 13, and the second post treatment device 20 containing the urea DeNOx catalyst 23 which differs from the DPF 13, with the first and second post treatment devices 10 and 20 being arranged concentrically.

The first post treatment device 10 contains the columnar DPF 13 within the cylindrical inner case 11 through the intermediation of a buffer member 12.

Although not shown in detail, the DPF 13 is of a structure in which a large number of pores are arranged in a honeycomb-like fashion. The pores communicate from an inflow side end surface 13A to an outflow side end surface 13B, that is, in the axial direction, and have a polygonal (e.g., hexagonal) sectional configuration.

As the pores, there are alternately arranged ones that are open at the inflow side end surface 13A and closed at the outflow side end surface 13B, and ones that are closed at the inflow side end surface 13A and open at the outflow side end surface 13B. Exhaust gas flowing in at the former pores passes through the boundary walls into the latter pores, and flows out to the downstream side. Further, particulate is collected at the boundary walls. The DPF 13 is formed of a ceramic material such as cordierite or silicon carbide, or a metal such as stainless steel or aluminum. The material is determined as appropriate according to the use. In this embodiment, a ceramic material is used.

Further, the DPF 13 is coated with an oxidation catalyst by wash coating or the like. Here, the oxidation catalyst directly burns the soot, and oxidizes the nitrogen monoxide in the inflow exhaust gas to produce nitrogen dioxide. The nitrogen dioxide produced is unstable in a high temperature atmosphere such as exhaust gas, and discharges oxygen to be turned into carbon monoxide again. By virtue of the oxidizing force due to the discharged oxygen, the particulate successively collected at the DPF 13 is burned in succession, thereby constantly maintaining the DPF 13 in a state in which there is no clogging. The portion of the nitrogen dioxide that has not been turned into nitrogen monoxide reaches the second post treatment device 20.

The second post treatment device 20 contains within the cylindrical outer case 21 the annular urea DeNOx catalyst 23 through the intermediation of a buffer member (not shown), and is arranged so as to surround the outer periphery of the first post treatment device 10. That is, the first post treatment device 10 is arranged at the hole portion at the center of the urea DeNOx catalyst 23, and is fixed in position by an arbitrary fixing means.

Of those, the urea DeNOx catalyst 23 is formed of a base metal such as zeolite or vanadium, and causes reaction between the ammonia obtained from the urea serving as the reducing agent and the NOx in the exhaust gas, decomposing the NOx into nitrogen and oxygen to thereby effect purification. The urea DeNOx catalyst 23 is divided into an upstream side stacked body 24 and a downstream side stacked body 25, and a turbulence is generated in the exhaust gas flow by an intermediate gap 26, causing an agitated state to thereby promote the reaction.

To enable the catalyst installation section 70 to be used if reversed, the catalyst installation section 70 is formed in a symmetrical configuration with respect to a section orthogonal to an axis extending in the direction in which the inflow/outflow section 80, the catalyst installation section 70, and the communication chamber forming section 30 are connected together and dividing the catalyst installation section 70 substantially at the center, making it possible to change the direction in which exhaust gas is caused to flow into and out of the first and second post treatment devices 10 and 20.

Further, a flange 21A is formed at an end of the outer case 21 as the outer cylinder portion, and a plurality of holes into which fixing screws are to be inserted are formed in the flange 21A. The inner case 11 serving as the inner cylinder portion is formed in a substantially cylindrical configuration, and an end portion thereof protrudes beyond the end portion of the outer case 21.

(3) Construction of the Communication Chamber Forming Section 30

The communication chamber forming section 30 is equipped with a dish-shaped cover 31 substantially of the same outer diameter as the outer case 21 of the second post treatment device 20. A flange 31A is formed along the outer peripheral edge of the cover 31, and a plurality of holes for inserting fixing screws are formed in the flange 31A.

Mounted to the center of the outer side of the cover 31 is a reducing agent supply device 32 for spraying urea as the reducing agent. Although not shown, the reducing agent supply device 32 is equipped with a tank for storing urea, a pump for sending the urea in the tank under pressure, a filter for removing dust, dirt, etc. in the urea sent under pressure, and further, a supply portion 33 for spraying urea into the communication chamber in the communication chamber forming section 30 together with air. The urea sprayed from the supply portion 33 is vaporized through heating by the exhaust gas to be thermally decomposed into ammonia, which is supplied to the urea DeNOx catalyst 23 of the second post treatment device 20.

(4) Connection Structure for the Exhaust Gas Purification Device 1

The inflow/outflow section 80, the catalyst installation section 70, and the communication chamber forming section 30, constructed as described above, abut each other at the flange 51A, the flange 21A, and the flange 31A, and are connected together by inserting fixing means such as bolts and nuts, into the plurality of holes formed in the flanges 51A, 21A, and 31A.

Here, the plurality of holes formed in the flange 51A of the inflow/outflow section 80, the plurality of holes formed in the flange 21A of the catalyst installation section 70, and the plurality of holes formed in the communication chamber forming section 30 are arranged so as to be opposed to each other at equal pitches, and allow fixation at the same positions if the catalyst installation section 70 is reversed.

The inner cylinder portion 41 is to be fit-engaged with the forward end portion of the inner case 11 of the catalyst installation section 70, and the inner cylinder portion 41 and the inner case 11 are fit-engaged with each other simultaneously solely by fixing the outer peripheral portion thereof thus facilitating the assembly and dismantling. This also applies to the case in which the catalyst installation section 70 is reversed.

The exhaust gas purification device 1, constructed as described above, is accommodated in the engine room of a construction machine, and is fixed, for example, to the back side of the hood, or mounted above the engine, whereby it can be arranged by utilizing the small space available between the engine and the hood. As a result, exclusively the outlet pipe 53 is exposed through the hood.

(5) Operation and Positive Effects of the Exhaust Gas Purification Device 1

Next, the operation and positive effects of this embodiment will be described.

Exhaust gas flows through the exhaust gas purification device 1 as indicated by arrows of FIG. 1. First, the exhaust gas from the engine enters the inlet chamber 40 of the inflow/outflow section 80 through the inlet pipe 45, and is supplied to the DPF 13 inside the inner case 11. After the particulate in the exhaust gas has been collected by the DPF 13, the exhaust gas is supplied to the communication chamber in the communication chamber forming section 30 through an exit 10B of the first post treatment device 10.

Inside the communication chamber of the communication chamber forming section 30, the flow of the exhaust gas purified by the DPF 13 is reversed and is supplied into the second post treatment device 20 through the entrance 20A. In this process, urea is sprayed into the communication chamber from the reducing agent supply device 32, and the exhaust gas is supplied into the second post treatment device 20 with the urea sprayed thereto.

In the second post treatment device 20, the ammonia obtained from the urea sprayed into the exhaust gas and the NOx in the exhaust gas are caused to react by the urea DeNOx catalyst 23, and the NOx in the exhaust gas is decomposed into nitrogen and water to thereby effect purification. The exhaust gas purified in the second post treatment device 20 is supplied to the outlet chamber 50.

The exhaust gas supplied into the outlet chamber 50 is supplied to the auxiliary device 60 provided in the outlet pipe 53. After the surplus ammonia has been decomposed into nitrogen and water by the oxidation catalyst 61, the exhaust gas is discharged to the exterior through the outlet pipe 53.

In the exhaust gas purification device 1 of this embodiment, constructed as described above, the particulate collected by the DPF 13 basically undergoes self-combustion by the action of the carried oxidation catalyst. If there exists some particulate remaining without being burned, the collected particulate is discharged to the communication chamber forming section 30 side by reversing the catalyst installation section 70 to thereby change the flow of exhaust gas flowing into the DPF 13, thereby preventing clogging in the DPF 13 more reliably.

Further, by reversing the catalyst installation section 70, it is possible to easily reverse the DPF 13 without having to extract it from the central portion. Further, since the urea DeNOx catalyst 23 is reversed simultaneously it is possible to change together the direction in which the exhaust gas flows into the urea DeNOx catalyst 23. When compared with the case in which the exhaust gas is caused to flow in always in the same direction, it is possible to prevent unbalanced deterioration of the urea DeNOx catalyst 23, thereby making it possible to achieve an improvement in terms of the utilization efficiency of the urea DeNOx catalyst 23.

Second Embodiment

Next, a second embodiment of the present invention will be described. In the following description, the portions that are the same as those described above are indicated by the same reference numerals and a description thereof will be omitted.

Figure 3:
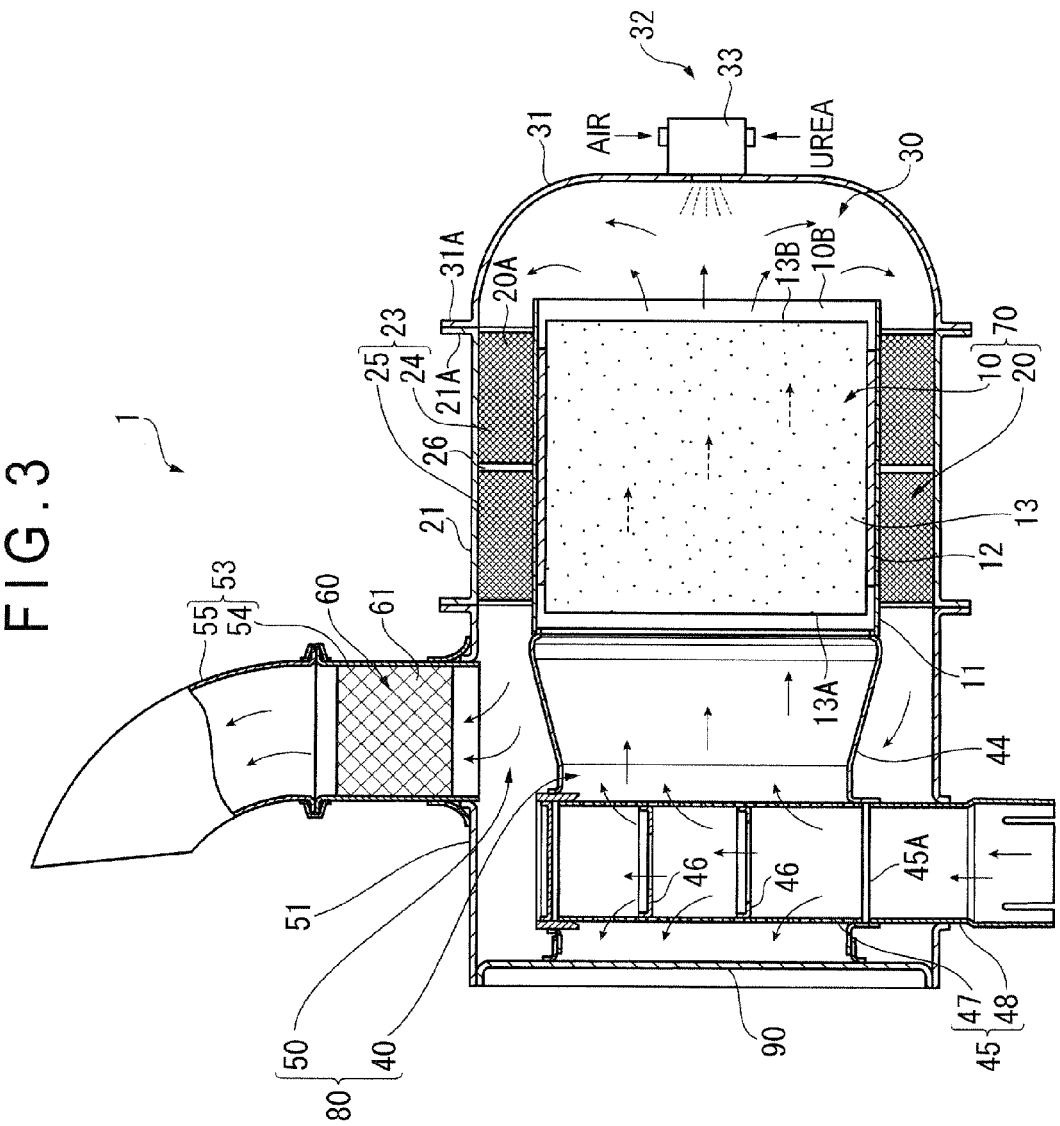
FIG. 3 is a general sectional view of an exhaust gas purification device for an internal combustion engine according to a second embodiment of the present invention.

FIG. 3 shows, as the second embodiment of the present invention, another embodiment of the inlet chamber 40 and the outlet chamber 50 of the exhaust gas purification device 1.

In this embodiment, the inlet chamber 40 and the outlet chamber 50 are closed by a common side wall portion 90. However, it is also possible to individually provide side wall portions.

Further, since the inner cylinder portion 44 is entirely arranged within the outer cylinder portion 51, the inlet chamber 40 is completely covered with the outlet chamber 50, and the inlet pipe 45 provided in the inlet chamber 40 is provided so as to extend through the peripheral wall of the outer cylinder portion 51. Further, the inlet chamber 40 is made small enough to be accommodated in the outlet chamber 50, and the exhaust gas purification device 1 as a whole is made more compact as compared with that of the first embodiment.

The inlet pipe 45 of the inlet chamber 40 is composed of an inner piper 47 fixed in position within the inner cylinder portion 44 by welding or the like, and an outer pipe 48 whose forward end is fit-engaged with the opening portion of the inner cylinder portion 44 and a midpoint of whose outer peripheral portion is fixed to the outer cylinder portion 51 by welding or the like, and a gap 45A is formed between the outer pipe 48 and the inner pipe 47. Due to the gap 45A, displacement caused by thermal expansion of the inner and outer pipes 47 and 48 is absorbed, and the thermal stress generated at the portion thereof bonded to the inner cylinder portion 44 and the thermal stress generated at the portion thereof bonded to the outer cylinder portion 51 are mitigated.

Unlike that of the first embodiment, the inner cylinder portion 44 is formed as a single component, and is fit-engaged with the side wall portion 90.

Otherwise, this embodiment is of the same construction as the first embodiment.

Modifications of the Embodiments

The present invention is not restricted to the above embodiments but includes other constructions helping to achieve the object of the present invention. The following modifications, etc. are also covered by the scope of the present invention.

For example, while in the above embodiments the oxidation catalyst 61 of the auxiliary device 60 is provided in the outlet pipe 53, it is also possible, as shown in FIG. 4 (first modification) and FIG. 5 (second modification) it may also be arranged in the annular portion at the exit of the second post treatment device 20, that is, between the outer periphery of the inner cylinder portion 44 and the outer cylinder portion 51. In this case, the oxidation catalyst 61 is of an annular configuration, and the outlet pipe 53 may be a unitary one in which the straight portion and the tail portion are continuous with each other.

While the second post treatment device 20 of the above embodiments employs the urea DeNOx catalyst 23 using urea as the reducing agent, it is also possible to employ a DeNOx catalyst using hydrocarbon (HC) such as fuel, as the reducing agent, or a NOx occlusion reducing catalyst. Further, it is also possible to employ some other DeNOx catalyst requiring no reducing agent. When hydrocarbon is used as the reducing agent, it is necessary to arrange on the downstream side of the second post treatment device 20, instead of the oxidation catalyst 61 making ammonia harmless, an oxidation catalyst of some other nature making hydrocarbon harmless through oxidation.

While in the above embodiments urea supplied through spraying is vaporized with the heat of the exhaust gas, it is also possible to provide a heater or the like inside the communication chamber forming section 30, vaporizing the urea more positively by sprinkling it over the heater.

While in the above embodiments the DPF 13 carries an oxidation catalyst, this should not be construed restrictively. For example, as shown in FIG. 5, instead of coating the DPF 13 with an oxidation catalyst, it is also possible to arrange an oxidation catalyst 161 in the second inner cylinder portion 42 at a position on the upstream side of the DPF 13.

While in the above embodiments the DPF 13 is provided as the central first post treatment device 10, and the urea DeNOx catalyst 23 is provided as the second post treatment device 20, it is also possible to provide a DeNOx catalyst such as a urea DeNOx catalyst, in the first post treatment device, and to provide a DPF in the second post treatment device. In this case, it is necessary to make the exhaust gas flow reverse to that in the above embodiments, so that the inlet chamber is formed by using the outer cylinder portion 51 of the above embodiments, and the outlet chamber is formed by using the inner cylinder portion 44 thereof. Further, the inlet pipe and the outlet pipe are reversed as compared with those of the above embodiments. However, by providing the DPF in the first post treatment device, it is possible to make the DPF columnar, which proves convenient when producing the DPF by using a ceramic material.

The best mode, method, etc. for carrying out the present invention disclosed above should not be construed restrictively. That is, while specific embodiments of the present invention have been shown and illustrated, it is possible for those skilled in the art to make various modifications on the above embodiments in terms of detailed configuration, amount, etc. without departing from the scope of technical idea and object of the present invention.

Accordingly, the above description with specific configuration, amount, etc. has only been given by way of example to facilitate the understanding of the present invention, and should not be construed restrictively, so that any description of the components of the present invention with partial or no limitations regarding configuration, amount, etc., is to be covered by the present invention.

INDUSTRIAL APPLICABILITY

Apart from various construction machines, the exhaust gas purification device of the present invention is applicable to all industrial machines using an internal combustion engine. Further, the device of the present invention may replace the conventional exhaust gas purification device of a vehicle with a large length.

The invention claimed is:

1. An exhaust gas purification device for an internal combustion engine, comprising:
    an inflow and outflow section divided into an inlet chamber into which unpurified exhaust gas flows and an outlet chamber from which purified exhaust gas is discharged, with the inlet chamber and the outlet chamber being arranged concentrically;
    a catalyst installation section which is detachably connected to the inflow and outflow section and in which two or more kinds of catalysts differing in an object of treatment are arranged concentrically around an axis along a connecting direction of the catalyst installation section and the inflow and outflow section and integrated with each other; and
    a communication chamber forming section detachably connected to a side of the catalyst installation section opposite to an inflow and outflow section side and adapted to reverse a flow of exhaust gas flowing in through the inlet chamber to a direction of the outlet chamber;

wherein the catalyst installation section is reversably connectable to the inflow and outflow section and the communication chamber forming section.

2. The exhaust gas purification device for the internal combustion engine according to claim 1, wherein the catalyst installation section has same connection portions on the inflow and outflow section side and on a communication chamber forming section side.

3. The exhaust gas purification device for the internal combustion engine according to claim 1, wherein the catalyst installation section has the inflow and outflow section side and a communication chamber forming section side formed symmetrically with respect to a section orthogonal to the connecting direction.

4. The exhaust gas purification device for the internal combustion engine according to claim 3, wherein:

the catalyst installation section is provided with an outer cylinder portion covering an outermost periphery and an inner cylinder portion provided between different catalysts, and a forward end of the inner cylinder portion in the connecting direction protrudes beyond a forward end of the outer cylinder portion, with a protruding portion being fit-engaged with the inflow and outflow section.

5. The exhaust gas purification device for the internal combustion engine according to claim 1, wherein:

the inlet chamber is provided with an inlet pipe into which unpurified exhaust gas flows in a direction orthogonal to a direction in which exhaust gas flows to the catalyst installation section, and the outlet chamber is provided with an outlet pipe for discharging purified exhaust gas in a direction orthogonal to a direction in which the exhaust gas purified by the catalyst installation section flows.

6. The exhaust gas purification device for the internal combustion engine according to claim 5, wherein:

the inlet chamber and the outlet chamber are defined by an inner cylinder portion and an outer cylinder portion arranged concentrically, with ends of the cylinder portions on a side opposite to a side where connection to the catalyst installation section is effected being closed by a side wall portion, and the end of the inner cylinder portion protruding outwardly beyond the end of the outer cylinder portion, and an inlet pipe or an outlet pipe provided in a chamber formed on the inner side of the inner cylinder portion is provided at a portion where the inner cylinder portion protrudes.

7. The exhaust gas purification device for the internal combustion engine according to claim 5, wherein:

the inlet chamber and the outlet chamber are defined by an inner cylinder portion and an outer cylinder portion arranged concentrically, with ends of the cylinder portions on a side opposite to a side where connection to the catalyst installation section is effected being closed by a side wall portion, and an inlet pipe or an outlet pipe provided in a chamber formed on the inner side of the inner cylinder portion is provided so as to extend through a peripheral wall of the outer cylinder portion, and is fit-engaged with the inner cylinder portion and fixed to the outer cylinder portion.

8. The exhaust gas purification device for the internal combustion engine according to claim 1, wherein:

the inflow and outflow section is divided into the inlet chamber on an inner side and an outlet chamber on the outer side, and the catalyst arranged at the center of the catalyst installation section is a diesel particulate filter.

9. The exhaust gas purification device for the internal combustion engine according to claim 8, wherein the diesel particulate filter has a DeNOx catalyst arranged on an outer side thereof.

10. The exhaust gas purification device for the internal combustion engine according to claim 9, wherein:

the DeNOx catalyst is a urea DeNOx catalyst, and the communication chamber forming section has a reducing agent supply device provided therein.

11. The exhaust gas purification device for the internal combustion engine according to claim 10, wherein the communication chamber forming section has a flow passage extending therefrom to the outlet chamber, with the flow passage being provided with an oxidation catalyst making ammonia harmless.

* * * * *